United States Patent
Schade et al.

(10) Patent No.: US 10,635,309 B2
(45) Date of Patent: Apr. 28, 2020

(54) METHOD FOR PROTECTING USER DATA OF A STORAGE DEVICE, AND ELECTRONIC COMPUTING SYSTEM

(71) Applicant: Continental Teves AG & Co. oHG, Frankfurt (DE)

(72) Inventors: Kai Schade, Münster (DE); Andreas Heise, Erzhausen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 360 days.

(21) Appl. No.: 15/444,889

(22) Filed: Feb. 28, 2017

(65) Prior Publication Data

US 2017/0168718 A1    Jun. 15, 2017

Related U.S. Application Data

(63) Continuation of application No. PCT/EP2015/069662, filed on Aug. 27, 2015.

(30) Foreign Application Priority Data

Aug. 29, 2014   (DE) .................. 10 2014 217 329

(51) Int. Cl.
*G06F 11/00* (2006.01)
*G06F 3/06* (2006.01)
*G06F 11/10* (2006.01)

(52) U.S. Cl.
CPC .......... *G06F 3/0604* (2013.01); *G06F 3/0619* (2013.01); *G06F 3/0629* (2013.01); *G06F 3/0673* (2013.01); *G06F 11/1004* (2013.01); *G06F 11/1048* (2013.01)

(58) Field of Classification Search
CPC .... G06F 3/0604; G06F 3/0619; G06F 3/0629; G06F 3/0673; G06F 11/1004; G06F 11/1048; G06F 11/072; G06F 11/076; G06F 11/1012; G11C 29/08; G11C 29/44; G11C 29/42
USPC ....... 714/807, 704, 763, 766, 767, 768, 769, 714/774
See application file for complete search history.

(56) References Cited

U.S. PATENT DOCUMENTS

| | | | |
|---|---|---|---|
| 8,370,715 B2 * | 2/2013 | Hafner | G06F 11/1076 714/769 |
| 9,189,326 B2 * | 11/2015 | Kalamatianos | G06F 11/1008 |
| 9,543,019 B2 * | 1/2017 | Frickey | G11C 11/5628 |
| 2013/0132799 A1 | 5/2013 | Zhu et al. | |
| 2013/0262958 A1 | 10/2013 | Ruggiero et al. | |
| 2014/0215174 A1 | 7/2014 | Otterstedt et al. | |

OTHER PUBLICATIONS

International Search Report and Written Opinion dated Jan. 4, 2016 of corresponding PCT application PCT/EP2015/069662.

\* cited by examiner

*Primary Examiner* — Christine T. Tu

(57) ABSTRACT

The invention relates to a method for protecting user data of a read/write storage device of an electronic computing system in a motor vehicle. Using test data relating to the run time of the electronic computing system, at least one protection region for protecting a storage region of the read/write storage device is established or removed or is specified in such a manner that the extent and/or position of the protection region with respect to a total storage region comprised by the read/write storage device is changed. The invention further relates to a corresponding electronic computing system.

12 Claims, 1 Drawing Sheet

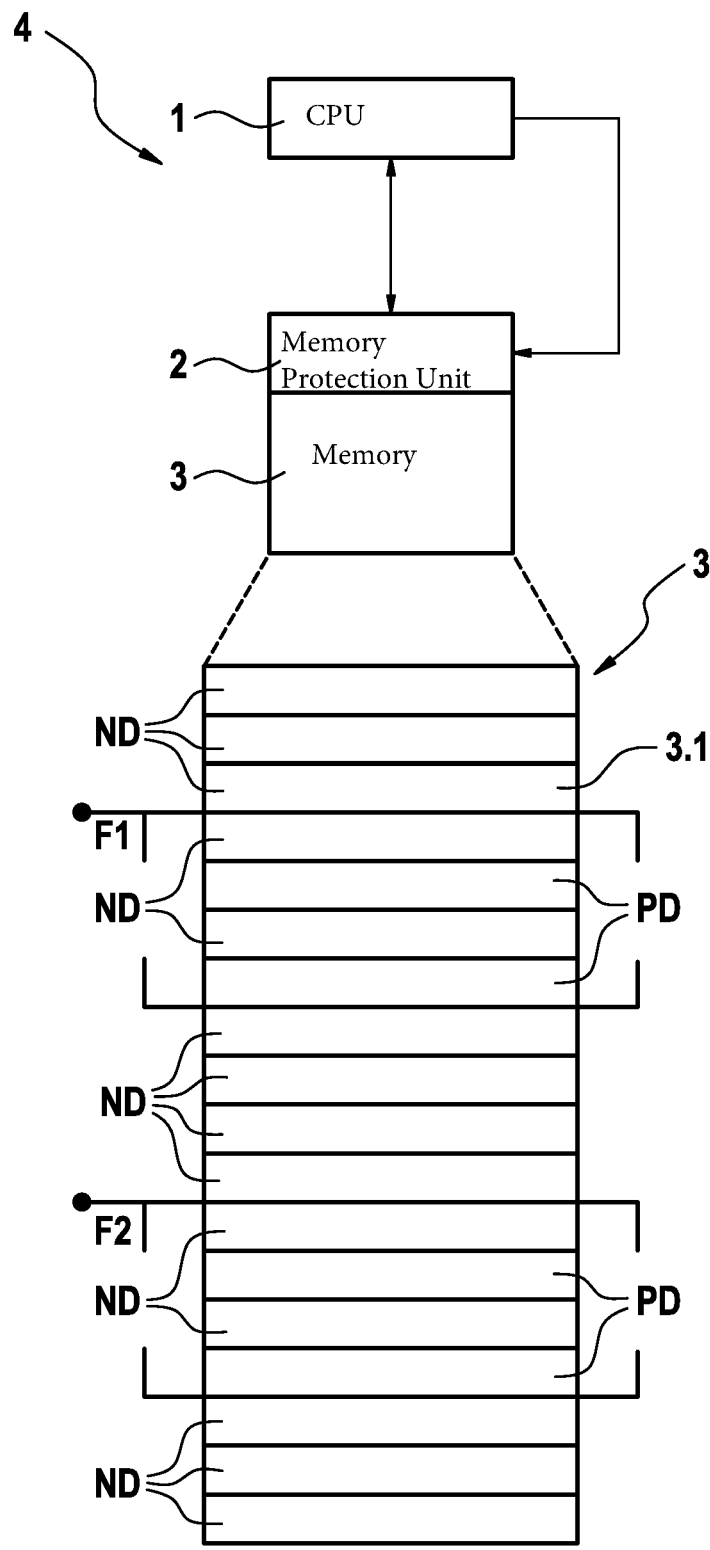

METHOD FOR PROTECTING USER DATA OF A STORAGE DEVICE, AND ELECTRONIC COMPUTING SYSTEM

CROSS REFERENCE TO RELATED APPLICATIONS

This U.S. patent application claims the benefit of PCT patent application No., PCT/EP2015/069662 filed Aug. 27, 2015, which claims the benefit of German patent application No., 10 2014 217 329.9 filed Aug. 29, 2014 all of which are hereby incorporated by reference.

TECHNICAL FIELD

The present invention relates to a method for protecting user data in a memory and to an electronic data processing system.

BACKGROUND

In order to comply with requirements for safety-related electronic systems in motor vehicles (e.g. ISO 26262), for safety-related control units in motor vehicles it is necessary that microprocessors and their interface modules and also externally connected functional modules such as e.g. bus drivers, memories, A/D converters etc. either have a safe structural design, i.e. exist redundantly, (=spatial), or are repeatedly checked at runtime (=temporal). The problem here in particular is the protection of memory chips such as e.g. DRAMs. Spatial redundancy is in this case a key cost driver, because full redundancy doubles the chip area, which is uneconomic especially for large datasets. Temporal checking can require extensive time resources for modern vehicle systems, with the FTTI, the time that can be tolerated between the occurrence and detection of a fault, being too long for safety-related data processing systems. A compromise is often used for DRAMs. Instead of holding memory elements redundantly available, ECC/EDC units (error correcting code and error detecting code units) are used to save in standard memory elements in addition to the user data also check data (ECC/CRC), which is automatically generated at the time of saving, and automatically compared at the time of reading. This check data is generated for a defined memory area, which means that there is no need to hold available the entire memory area several times over, and check data only needs to be added to safety-critical areas. This check data encompasses about 25 to 100% of the memory to be protected, depending on the size of the user datum to be written, or encompasses about 12.5 to 20% if the corresponding address data is taken into account in addition to the user data. DE 195 29 434 B4, for instance, describes such a system.

The address information inside this protected memory area is given less weight in favor of a higher error correction performance for the user data. This is achieved by weighting the respective address bits differently in the check-data calculation, with the higher address bits typically being included with less weight. The error detection and correction capability of the check codes with regard to the user data is thus inversely proportional to the size of the protected memory areas. The error detection and/or error correction capability thus decreases as the memory areas to be protected increase. This weighting is implemented by hardware (hard-wired) and sets the basis for the mathematical calculation of the check codes. For modern applications in motor vehicles, the defined memory area may be designed too small, for example, if using known systems only 8 Mbytes would be usable in protected form even though 256 Mbytes are needed. Thus saving program data and/or user data either does not achieve a required safety level or the protected memory area for this is very limited.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The system provides means for protecting data in a memory, which allow an improved ratio of the error detection and/or error correction capability to a memory requirement for check data that must be provided for said capability, and thereby can be implemented as cheaply as possible.

A method for protecting user data in a read/write memory of an electronic data processing system in a motor vehicle, comprises at runtime of the electronic data processing system at least one protection area for protecting the user data in the memory area of the read/write memory by means of check data is specified or removed or defined in such a way that the extent and/or position of said protection area with respect to a total memory area encompassed by the read/write memory is changed.

It is thus possible during the running operation of an underlying electronic data processing system or during the execution of a program, to select memory areas to be protected, thereby considerably improving the configurability. "Running operation" of the electronic data processing system shall be understood to mean here in particular an active state in which this system executes processing operations. Hence allowing an improved ratio of the error detection and/or error correction capability to a memory requirement to be provided for said capability, and thereby can be implemented more cheaply than, for example, redundant memory solutions. Also the check data can additionally be protected.

Using check data to protect the memory area(s) is preferably performed using hardware-implemented and/or software-implemented error detection techniques and/or error correction techniques such as e.g. ECC or EDC, which can be used to check and/or correct the user data present in the read/write memory. In this case, the check data is generated in particular during writing to the read/write memory, whereas a check and, if applicable, correction, takes place during readout of the user data. An extremely wide variety of embodiments of data storage devices for electronic systems can be used as the read/write memory, for instance devices such as semiconductor memories or magnetic storage devices.

According to one embodiment, an assignment is provided between a program module being executed by the electronic data processing system and/or memory area of a program code and the memory area to be protected defined by the protection area. In particular, the memory area of the program code is defined by the underlying virtual or physical memory. Which program module is being executed at a particular time is in this case preferably determined by means of the memory addresses of the underlying memory area of a program code.

According to another embodiment, when a plurality of protection areas exist in the memory area of the read/write memory, these protection areas can be configured independently of one another. This achieves an increase in the focusing in particular solely on safety-critical data, and improves the configurability of the data protection.

As a result of changing a protection area from a first memory area to a second memory area of the read-write memory, or removing a first protection area of a first memory area and generating a new protection area for a second memory area, preferably no memory access can be made to the first memory area. This is advantageous particularly for partitioning the safety-related and/or security-related data and for preventing software modules involved in each case from being able to access a memory area to which these modules are not assigned and/or which they are not allowed to access for other reasons such as e.g. a lower safety level.

An electronic data processing system for a motor vehicle comprises at least one central processing unit, a read/write memory and a memory protection unit for protecting user data in at least one memory area of the read/write memory by means of check data, wherein the memory protection unit is designed to specify, remove or define at runtime of the electronic data processing system at least one protection area for protecting a memory area of the read/write memory in such a way that the extent and/or position of said protection area with respect to a total memory area encompassed by the read/write memory is changed.

An assignment means is preferably provided for the assignment between a program module being executed by the electronic data processing system and/or memory area of a program code and the memory area to be protected defined by the protection area.

Preferably, the system is used in, or in conjunction with, one or more digital signal processors, FPGAs (field programmable gate arrays), or RISC/CISC-CPUs, in particular devices with a fast clock speed.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DETAILED DESCRIPTION OF THE DRAWINGS

The present disclosure will become more fully understood from the detailed description and the accompanying drawings, wherein:

FIG. 1 shows in a schematic diagram an electronic data processing system for the purpose of explaining the protection according to the invention of data in a memory.

DETAILED DESCRIPTION

FIG. 1 shows a schematic diagram of an electronic data processing system 4, e.g. a microprocessor system, for the purpose of explaining the invention. According to this exemplary embodiment, memory 3 is assigned to the central processing unit (CPU) 1, with memory protection unit 2 using check data PD to protect user data ND in memory 3. Memory 3, for example, is a direct random access semiconductor memory, e.g. a RAM. Error detection and/or error correction techniques known per se such as ECC, for example, can be used to generate the check data PD. This check data PD is generated by memory protection unit 2 at the time of saving user data ND in memory 3, and at the time of reading is compared in a manner known per se with check data recalculated from the read user data ND. To provide greater clarification, the lower part of FIG. 1 shows an example allocation of check data PD and user data ND in RAM 3, where a cell 3.1 is in particular an individual memory cell or, depending on the granularity of memory 3, a smallest possible readable or writable unit, e.g. a word.

According to an exemplary embodiment, memory protection unit 2 specifies the protection areas F1 and F2 inside the total memory area of memory 3 that are meant to be protected, or are protected, by means of check data PD. In this example, two protected memory areas F1, F2 are defined, although it is also possible to have more than two or only a single memory area at the same time or even no protected memory area. At runtime of data processing system 4, memory areas that are meant to be protected by user data ND can be specified multiple times independently of one another by memory protection unit 2 or can be reclassified by said unit as not to be protected. In addition, the size of each existing protected memory area or protection area F1, F2 can be defined, and changed during running operation of the data processing system 4.

The memory areas to be protected and/or the size thereof are preferably specified by the assignment of a program module being executed at the current time by the data processing system 4 in such a way that the program module being executed at the current time defines the memory area to be protected, or a memory area to be protected is assigned to this module. Which program module is being executed at the current time can be determined here, for example, by means of the memory addresses of the underlying memory area of a program code. The assignment or allocation of a program module or its program memory area to a memory area to be protected can be performed by the memory protection unit 2 using an allocation table, for example. This allocation table can be created, managed and statically stored by the relevant part of the operating system software in order to be available to the memory protection unit 2 (hardware) at all times regardless of the current status of the actual program execution. This implementation would allow the memory protection unit 2 to configure the protection areas itself.

According to an alternative embodiment, memory protection unit 2 is only ever configured for one area to be protected, this being done by software implementing the relevant configuration when a program area requiring protection in terms of data and/or instructions is jumped to or activated at system runtime. According to this implementation, the corresponding allocation table is managed by software, and is not necessarily made available to memory protection unit 2, but prior to program execution is checked by the software according to need for configuring memory protection unit 2. This alternative embodiment advantageously does not require any additional resources, for instance resources such as an integrated logic circuit for accessing and reading the access table or an integrated logic circuit for dynamic configuration of memory protection unit 2. It can be implemented in existing systems by suitable adaptation of the software.

The additional memory requirement for the check data PD needed for implementing the invention is calculated for the exemplary embodiment shown in FIG. 1 as follows:

$$S_{PD}=S_{NDF1}*Size_{PD}/Size_{ND}+S_{NDF2}*Size_{PD}/Size_{ND}$$

where $S_{PD}$—total additional memory volume for the check data
$S_{NDF1}$—memory volume inside protection window F1
$S_{NDF2}$—memory volume inside protection window F2
$Size_{ND}$—memory volume of a memory cell 3.1 for the user data
$Size_{PD}$—memory volume of the check data for protecting a memory cell containing user data The software architecture is preferably designed in such a way that after a change to a protection area from a first memory area to a second memory area, or removing a first protection area of a first memory area and generating a new protection area for a second memory area, no memory access can be made to the first memory area. The removal of protection for a memory area does not change the content or extent of the stored data, which comprises user data and check data, but allows it to be overwritten. One advantage, for example, is that an application on microcontroller units (MCU) can specify or manage for its ECC logic (memory error correction) just one memory area, because this logic also only has available that number of configuration registers, e.g. offset, length, status, config, etc., that are needed for one protection area. By virtue of the invention, just one reconfigurable protection area can thus be used to operate a plurality of protection areas practically simultaneously. In the case of a data access (not an access to program code), a correct address assignment to the user data is implemented in particular by adapting the software, because incrementing the physical memory address automatically could result in access to a memory cell 3.1 containing check data, since after removing the protection for a memory area, the addressing can no longer be performed selectively according to user data or check data. Thus there would inevitably be read operations in which user data would be read from check data addresses. To avoid this, the manner in which the data is accessed and interpreted by the addressing, decoding and checking blocks located directly in the signal path is modified such that the check data PD is not read and instead is largely ignored. The same applies to instructions, although, in particular apart from self-modifying program code, primarily for the read case. In a situation in which a program module, for example, needs to read both data and program code from a memory in a read-only and not necessarily protected manner, as is the case for a checksum calculation covering the entire memory area, the check data PD is thus not included in the checksum. For these and comparable cases, instructions are preferably likewise skipped accordingly. Alternatively, a repeated new configuration or reconfiguration of the protection area is possible on entering or leaving the protection area.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for protecting user data of a memory of an electronic data processing system in a motor vehicle, the method comprising:
   one of specifying, removing and defining during operation of the electronic data processing system at least one protection area of the memory for storing user data and check data corresponding thereto, the check data comprising at least one of an error correction code and an error detection code corresponding to the user data stored in the at least one protection area, a size of said at least one protection area with respect to the memory is defined
   one of changing the at least one protection area from a first memory area of the memory to a second memory area of the memory, and removing a first protection area of the at least one protection area from a first memory area of the memory and generating a new protection area, different from the at least one protection area, for a second memory area of the memory; and
   following the one of changing the at least one protection area and removing a first protection area and generating a new protection area, preventing memory access to the first memory area of the memory.

2. The method of claim 1, further comprising assigning the at least one protection area of the memory to at least one of: a program module being executed by the electronic data processing system, and a memory area in the memory containing program code.

3. The method of claim 2, further comprising, following the assigning, preventing another program module and another memory area containing program code which are not the at least one of the program module being executed by the electronic data processing system and the memory area in the memory containing the program code which is assigned to the at least one protection area from accessing the at least one protection area.

4. The method of claim 1, wherein the at least one protection area comprises a plurality of protection areas in the memory, each protection area being configured independently of one another.

5. The method of claim 1, wherein the memory comprises a random access memory (RAM).

6. The method of claim 1, wherein the memory includes, in an area of the memory outside of the at least one protection area, user data without corresponding check data.

7. An electronic data processing system for a motor vehicle, comprising:
   at least one central processing unit;
   a memory; and
   a memory protection unit communicatively coupled to the at least one central processing unit and the memory, for protecting user data in the memory by using check data corresponding to the user data, the check data comprising at least one of ECC and EDC codes for the user data, wherein the memory protection unit includes instructions which when executed by the memory protection unit performs one of specifying, removing, and defining during operation of the electronic data processing system a protection area in the memory for storing the user data and the check data corresponding thereto such that a size of said protection area with respect to the memory is defined
   wherein the memory protection unit includes instructions which when executed performs one of changing the protection area from a first memory area of the memory to a second memory area of the memory, and removing the protection area and generating a new protection area, different from the protection area in a second memory area of the memory, and
   wherein the memory protection unit further includes instructions for, following execution of the instructions for one of changing the protection area and removing the protection area and generating a new protection area, preventing memory access to the first memory area of the memory.

8. The electronic data processing system of claim 7, wherein the memory protection unit includes instructions which when executed performs assigning the protection area in the memory to at least one of: a program module being executed by the electronic data processing system, and a memory area of the memory containing a program code.

9. The electronic data system of claim 8, wherein the memory protection unit prevents access to the protection area by another program module and another memory area containing program code which are not the at least one of the program module and the memory area of the memory which is assigned to the protection area.

10. The electronic data processing system of claim 7, wherein the protection area comprises a plurality of protection areas of the memory and each protection area being configured independently of one another.

11. The electronic data processing system of claim 7, wherein the memory is a random access memory (RAM).

12. The electronic data processing system of claim 7, wherein the memory includes, in an area of the memory outside of the protection area, user data without corresponding check data.

* * * * *